(12) United States Patent
Dumas et al.

(10) Patent No.: US 11,952,950 B2
(45) Date of Patent: Apr. 9, 2024

(54) AXIAL TURBINE ENGINE, AND RECTIFIER STAGE WITH VARIABLE ORIENTATION VANES FOR AN AXIAL TURBINE ENGINE

(71) Applicant: SAFRAN AIRCRAFT ENGINES SAS, Paris (FR)

(72) Inventors: Lilian Yann Dumas, Bois le Roi (FR); Baptiste René Roger Batonnet, Sezanne (FR); Romain Nicolas Lagarde, La Queue en Brie (FR)

(73) Assignee: SAFRAN AIRCRAFT ENGINES SAS, Paris (FR)

( * ) Notice: Subject to any disclaimer, the term of this patent is extended or adjusted under 35 U.S.C. 154(b) by 44 days.

(21) Appl. No.: 17/628,608

(22) PCT Filed: Jul. 23, 2020

(86) PCT No.: PCT/EP2020/070856
§ 371 (c)(1),
(2) Date: Jan. 20, 2022

(87) PCT Pub. No.: WO2021/013957
PCT Pub. Date: Jan. 28, 2021

(65) Prior Publication Data
US 2022/0275762 A1 Sep. 1, 2022

(30) Foreign Application Priority Data
Jul. 24, 2019 (FR) .................................. 1908399

(51) Int. Cl.
*F02C 9/20* (2006.01)
*F01D 17/16* (2006.01)
(Continued)

(52) U.S. Cl.
CPC .............. *F02C 9/20* (2013.01); *F01D 17/162* (2013.01); *F02C 6/08* (2013.01); *F02C 9/18* (2013.01);
(Continued)

(58) Field of Classification Search
CPC ...... F04D 27/023; F04D 29/563; F01D 25/12; F01D 17/162; F01D 17/105;
(Continued)

(56) References Cited

U.S. PATENT DOCUMENTS

| | | | |
|---|---|---|---|
| 2011/0072829 A1* | 3/2011 | Bil | F02C 9/18 60/785 |
| 2011/0110773 A1* | 5/2011 | Domercq | F04D 27/023 415/191 |
| 2016/0376916 A1* | 12/2016 | Grothe | F01D 9/041 415/149.2 |

FOREIGN PATENT DOCUMENTS

| | | | | |
|---|---|---|---|---|
| GB | 2027811 A | * | 2/1980 | ........... F01D 17/162 |
| WO | 2009144300 A1 | | 12/2009 | |

OTHER PUBLICATIONS

International Search Report for PCT/EP2020/070856 dated Sep. 3, 2020.
Written Opinion for PCT/EP2020/070856 dated Sep. 3, 2020.

* cited by examiner

*Primary Examiner* — Topaz L. Elliott
*Assistant Examiner* — Jesse M Prager
(74) *Attorney, Agent, or Firm* — Sandberg Phoenix & von Gontard, P.C.

(57) ABSTRACT

An axial turbomachine comprising a compression device with a variable-orientation vane rectifier stage; a combustion chamber downstream of the compression device; a turbine device downstream of the combustion chamber; and a leak passage of air compressed by the compression device,
(Continued)

between the compression device and the turbine device for cooling the turbine device; and where the rectifier stage is configured to modulate the section of the leak passage according to the orientation of the vanes of the stage.

7 Claims, 3 Drawing Sheets

(51) Int. Cl.
    *F02C 6/08*         (2006.01)
    *F02C 9/18*         (2006.01)
    *F04D 27/02*       (2006.01)
    *F04D 29/56*       (2006.01)

(52) U.S. Cl.
    CPC ......... *F04D 27/023* (2013.01); *F04D 29/563* (2013.01)

(58) Field of Classification Search
    CPC ...... F01D 5/08–088; F02C 7/125; F02C 9/20; F02C 6/08; F02C 9/18
    See application file for complete search history.

AXIAL TURBINE ENGINE, AND RECTIFIER STAGE WITH VARIABLE ORIENTATION VANES FOR AN AXIAL TURBINE ENGINE

The present invention is the US national stage under 35 U.S.C. § 371 of International Application No. PCT/EP2020/070856 which was filed on Jul. 23, 2020, and which claims the priority of application FR 1908399 filed on Jul. 24, 2019, the content of which (text, drawings and claims) are incorporated here by reference in its entirety.

FIELD

The invention relates to the field of turbomachines, more particularly turbojets, more particularly bypass turbojets.

BACKGROUND

In a turbomachine which can be considered to be axial due to multiple circumferential stators and rotors following one another along a longitudinal axis from upstream to downstream of said machine, in particular of the double-flow type, a primary gas generator flow is determined. The turbomachine comprises a compressor, a combustion chamber and a turbine determining a primary stream for the primary flow. It is known to provide an air leak passage from the primary stream, from the compressor to the turbine, with a view to ensuring cooling of the turbine and possibly other components such as the downstream side of the compressor.

The patent document published FR 2 690 482 A1 discloses an air bleed leak circuit in a double-flow axial turbomachine with a view to cooling the high-pressure compressor and the turbine. To this end, the circuit provides a first source in the annular duct fluidly connecting the low-pressure and high-pressure compressors, and a second source in the high-pressure compressor. The annular duct corresponds to the primary stream of the turbomachine. The first source supplies a cooling circuit around the central shaft, or low pressure, to the turbine while the second source supplies another cooling circuit around a shaft outside the central shaft, or high pressure, downstream of the high-pressure compressor and the high-pressure turbine. The air from the second source is warmer than the air from the first source. Valves make it possible to modulate the two air flows. The sources disclosed in this document form air intakes on the outer casing of the primary stream, the circuit then extending towards a stream of the secondary flow to pass into an intermediate casing upstream of the sources. This complex configuration of the circuit can prove to be disadvantageous from a manufacturing cost point of view and also from the point of view of pressure drops.

The patent document published WO 2009/144300 A1 discloses a configuration of an axial turbomachine turbine cooling circuit, where orifices in a mounting flange on a high-pressure turbine disk are provided in order to achieve an axial passage of the cooling flow.

Particularly critical cooling needs are at the high-pressure turbine disc. Cooling air circulates axially between the high-pressure shaft and a bore of the high-pressure turbine disk. This cooling is commonly referred to by the expression "Bore Cooling". It is sized according to different compromises. The engine clearances, including those provided for the air bleed sources, are optimized according to different operating points. The "bore cooling" section can change depending on the engine speed and more or less rapid variations in acceleration or deceleration of the engine speed: the greater the clearances, the better the bore cooling section will be to obtain a greater air flow rate, however the engine performance will be impacted because the leaks reduce the efficiency of the rotors and stators in the primary stream. The case of operation of the turbomachine at idle influences the sizing compromises. The bore cooling section at idle on transient phases is a major problem: if the bore cooling section used for cooling the turbine clearances is not sufficiently optimized, these clearances could remain very closed, for example during rapid acceleration. engine after long idling, which could damage the turbine engine.

SUMMARY

The object of the invention is to remedy at least one of the drawbacks of the above-mentioned state of the art. More particularly, the object of the invention is to allow satisfactory cooling for all speeds while keeping it to a minimum in nominal operation, and to do so in an efficient manner.

The invention is directed to an axial turbomachine comprising; a compression device with a rectifier stage with variable orientation vanes; a combustion chamber downstream of the compression device; a turbine device downstream of the combustion chamber; and a leak passage of air compressed by the compression device, between the compression device and the turbine device for cooling the turbine device; wherein the rectifier stage is configured to modulate the cross section of the leak passage as a function of the orientation of the vanes of the stage. The leak passage extends to the turbine device.

The compression device, the combustion chamber and the turbine device form a primary annular stream and delimit one or more enclosures inside the stream. Advantageously, the leak passage passes through the or at least one of the enclosures. The axial turbomachine comprises an inner shaft and an outer shaft that are concentric along the axis of the turbomachine. Advantageously, the leak passage extends in part along the outer shaft.

According to an advantageous exemplary embodiment of the invention, the modulation of the cross section of the leak passage by the rectifier stage is such that the cross section of the leak passage increases when the stage decreases the cross section of the passage in the compression device, and vice versa.

According to an advantageous exemplary embodiment of the invention, at least one of the vanes of the rectifier stage comprises a root with an orifice or a notch forming, with an orifice or a corresponding notch on an internal ring of the rectifier stage, the leak passage modulating as a function of the orientation of the vanes of the stage. At least one of the vanes can correspond to only one of the vanes, to a limited number or even to all the vanes of the rectifier stage.

According to an advantageous exemplary embodiment of the invention, the leak passage comprises a non-modulating leak passage in parallel with the modulating leak passage formed by the rectifier stage.

According to an advantageous exemplary embodiment of the invention, the inner ring of the rectifier stage comprises an upstream edge facing an edge of an annular duct on an intermediate casing of the turbomachine, with a clearance between the edges forming the non-modulating leakage passage.

According to an advantageous exemplary embodiment of the invention, for each of the at least one vane of the rectifier stage, the root comprises a platform with an interior face perpendicular to a radial direction corresponding to an axis of rotation of the vane, the orifice or notch of the root being formed in the platform, and the leak passage through the orifice or notch in the platform being parallel to the radial direction.

According to an advantageous exemplary embodiment of the invention, for each of the at least one vane of the rectifier stage, one of the orifice or notch on the platform and of the orifice or notch on the ring is of the size greater than the other one, so as to form a maximum passage section over an angular positioning range of the vane of more than 15°. Advantageously, in various instances this range is less than 35°.

According to an advantageous exemplary embodiment of the invention, for each of the at least one vane of the rectifier stage, the orifice or the notch of the root has a passage section greater than 10 mm$^2$ and/or less than 30 mm$^2$.

According to an advantageous embodiment of the invention, the compression device comprises a low-pressure compressor and a high-pressure compressor downstream of the low-pressure compressor via an annular duct formed on an intermediate casing of the turbomachine, the rectifier stage being at the inlet of the high-pressure compressor, downstream of the annular duct. Such an annular duct is a section of the primary stream of the turbomachine.

According to an advantageous embodiment of the invention, the leak passage passes between a bore of a rotor of the turbine device and the exterior surface of a shaft, in various instances exterior, of the turbomachine.

The subject of the invention is also a rectifier stage with variable-orientation vanes for an axial turbomachine, comprising a row of vanes, each of the vanes comprising an aerodynamic blade extending radially and a root at a lower end of the aerodynamic blade; an inner ring receiving the roots of the vanes; the vanes being radially orientable; wherein, for at least one of the vanes, the root comprises an orifice or a notch forming with an orifice or a corresponding notch on the inner ring a leak passage with variable section depending on the orientation of the at least one vane.

The measures of the invention are advantageous in that they make it possible to modulate the section of leak passage of air compressed by the compression device, with a view to cooling in particular the turbine device, by means which are also controlled. under operating conditions of the turbomachine which precisely require a modification of the passage section. These means are in fact linked to a rectifier stage with orientable vanes, in various instances located at the inlet of a high-pressure compressor, and vary as a function of the angular orientation of the vanes in question. These means are advantageously controlled by means of the roots of the vanes and can take various forms. They can take the form of an air passage clearance, the size of which varies as a function of the angular orientation of the vanes. These means are in various instances formed by orifices or notches formed in the vane roots and cooperating with corresponding orifices or notches on the inner ring receiving the feet in question.

Other features and advantages of the present invention will be better understood from the description and the drawings.

DRAWINGS

Figure 2:
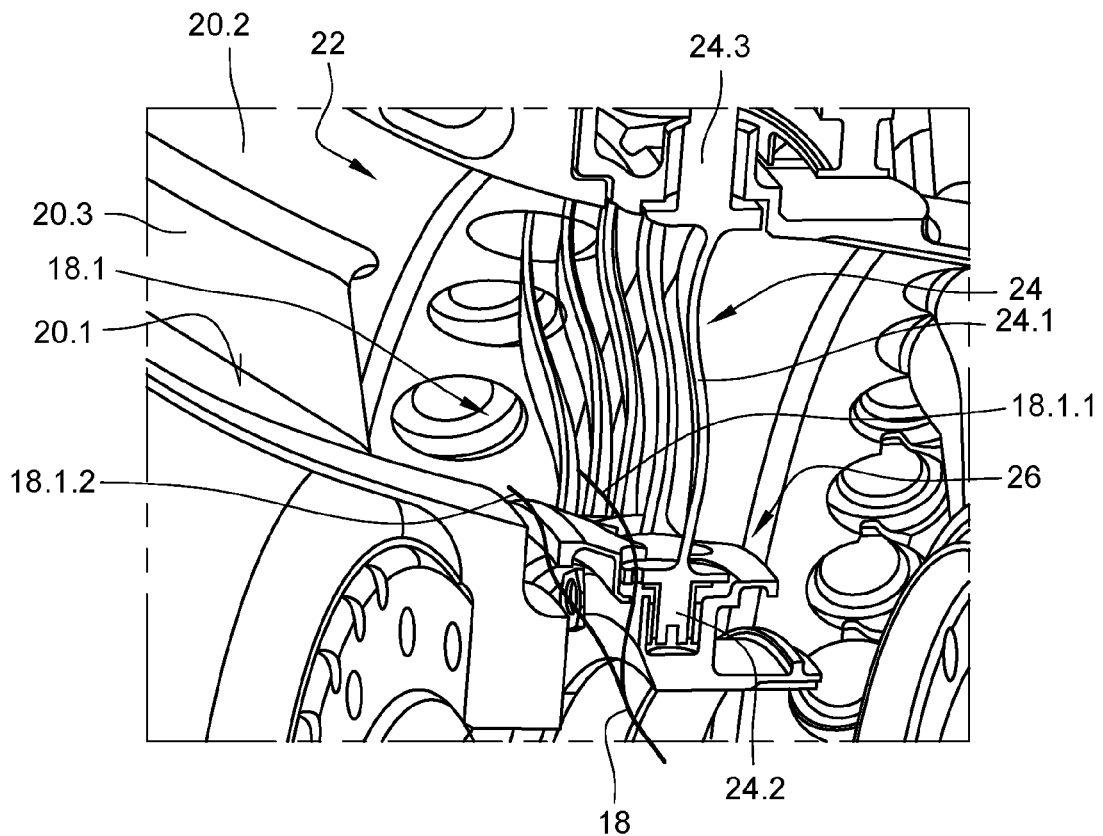
FIG. 2 is a perspective view of the inlet rectifier stage of the high-pressure compressor of the turbomachine of FIG. 1, where the vanes are in the position of reducing the passage section, corresponding to an idling speed, according to various embodiments of the invention.
Figure 4:
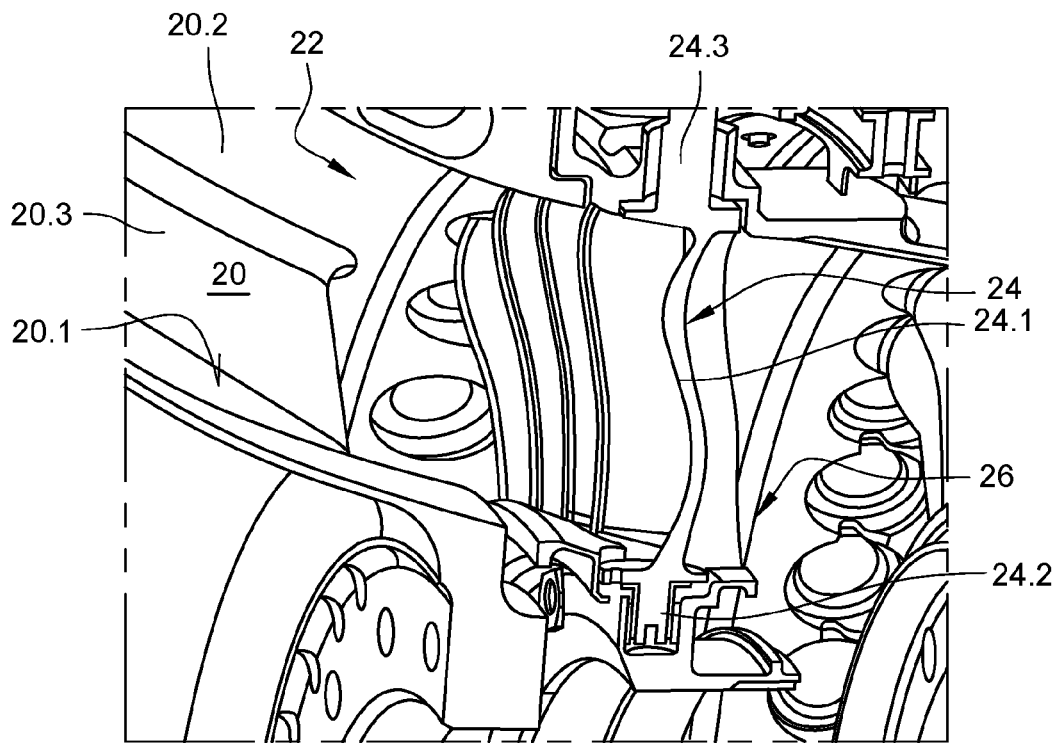

FIG. 4 corresponds to FIG. 2 where the vanes are in the position of increasing the passage section, corresponding to an acceleration of the speed or an operation at nominal speed, according to various embodiments of the invention.

Figure 5:
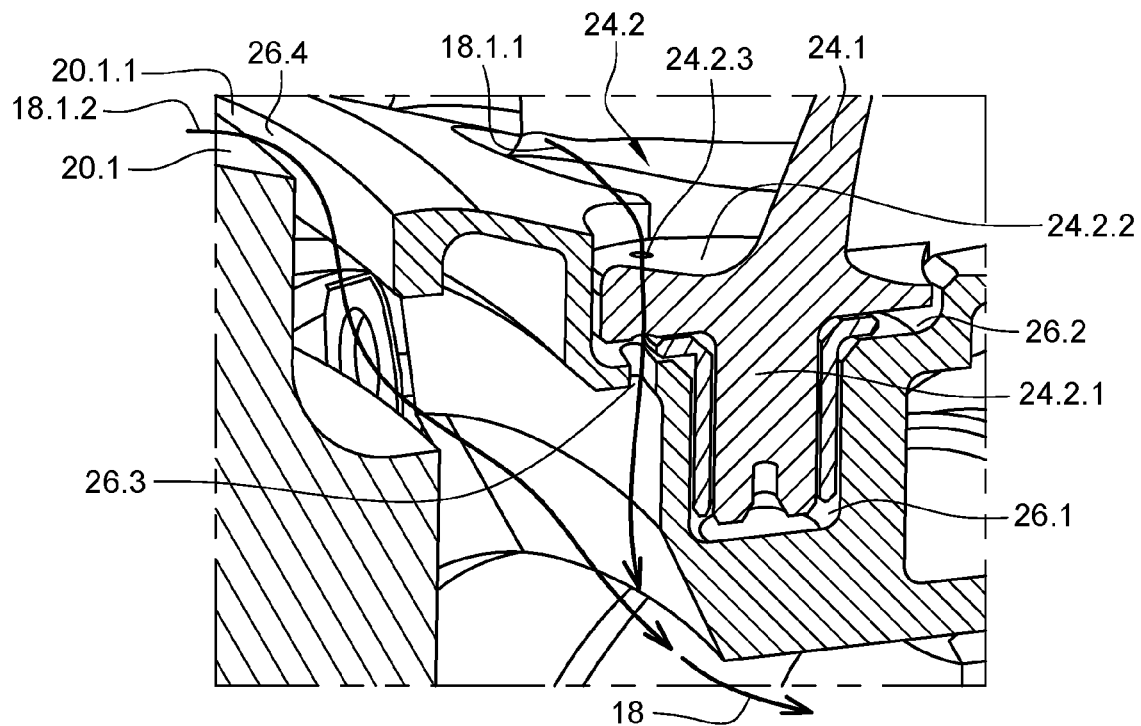

FIG. 5 is an exemplary detail view of FIG. 4 showing the modular air leak passage produced by the rectifier stage, in the closed state, according to various embodiments of the invention.

Figure 6:
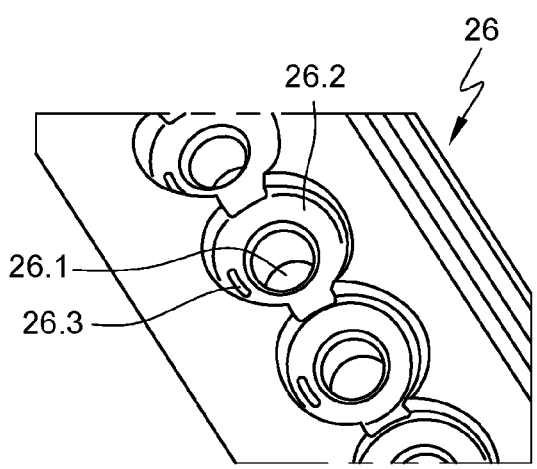

FIG. 6 is an exemplary perspective view of the inner ring of the rectifier stage of the turbomachine of FIGS. 1 to 5, according to various embodiments of the invention.

Figure 7:
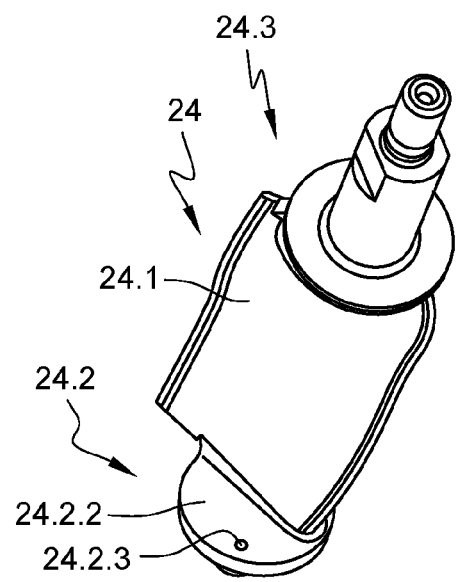

FIG. 7 is an exemplary perspective view of a vane of the rectifier stage of the turbomachine of FIGS. 1 to 5, according to various embodiments of the invention.

DETAILED DESCRIPTION

In the description which follows, the notions of positioning expressed by the terms "inside" and "outside", including their plural and their feminine, are to be understood with respect to a direction radial to the main axis of the turbomachine. For an element of the turbomachine, the term "outside" therefore signifies further away from the axis than the term "inside", and vice versa.

Figure 1:
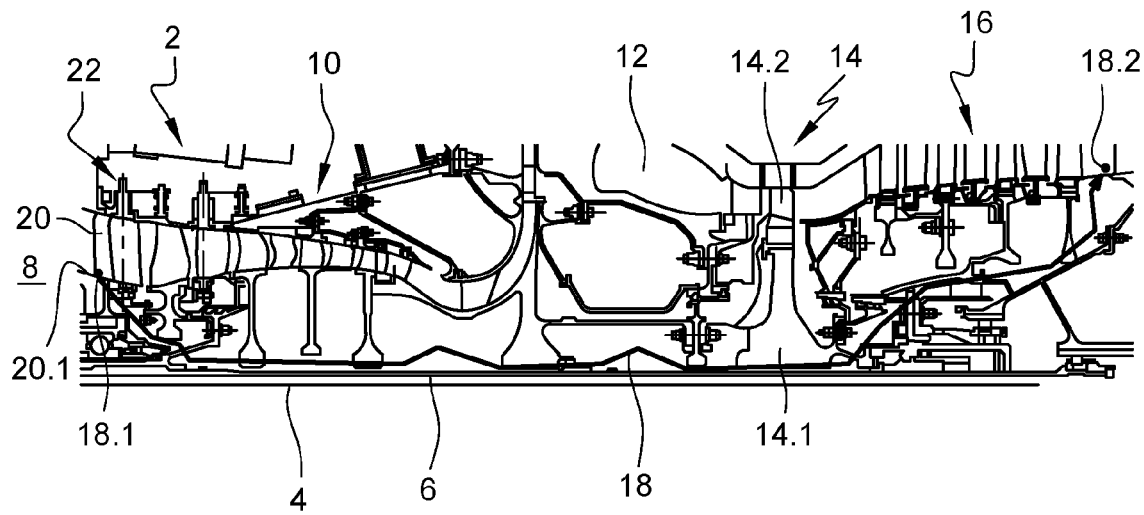
FIG. 1 is a longitudinal sectional view of a turbomachine according to various embodiments of the invention, exemplarily illustrating the cooling air leak passage from the high-pressure turbine.

FIG. 1 is a view in longitudinal section of an axial turbomachine according to the invention. The axial turbomachine 2 is in this case of the double-flow type and more precisely still an aircraft turbojet.

The axial turbomachine 2 conventionally comprises a central shaft 4, called the low-pressure (LP) shaft, and an outer shaft 6, concentric with the central shaft 4, called the high-pressure (HP) shaft. The central shaft 4 supports a turbo-fan or air intake fan, not shown, and a low-pressure compressor rotor 8, not detailed. The outer shaft 6 for its part supports a high-pressure compressor rotor 10 located downstream of the low-pressure compressor 8. A combustion chamber 12, fixed, is arranged downstream of the high-pressure compressor 10. A high-pressure turbine 14 is placed directly downstream of the combustion chamber. The turbine in question comprises a rotor 14.1 in the form of a disc, with blades 14.2 and supported by the outer shaft 6, so as to drive the high-pressure compressor 10. A low-pressure turbine 16 is arranged in front of the high-pressure turbine 14 and comprises a rotor supported by the central shaft 4 so as to drive the low-pressure compressor 8 and the turbo-fan. The architecture of the axial turbomachine which has just been described is conventional and per se well known to those skilled in the art.

Still with reference to FIG. 1, it can be observed that a cooling air leak passage 18, going from the compression part to the turbine part, is shown. This passage 18 comprises an air intake 18.1 at the outlet of the annular duct 20 formed by the intermediate casing of the axial turbomachine, connecting the low-pressure compressor 8 to the high-pressure compressor 10. More specifically, the air intake 18.1 is at the level of the inner wall 20.1 of the annular duct 20, more specifically still at the level of the rectifier stage 22 of the inlet (RDE) of the high-pressure compressor 10. As can be seen in FIG. 1, the passage of cooling leakage air 18 extends, along an inclined path, between a bearing supporting the outer shaft 6 and the rotor of the high-pressure compressor and axially between the outer shaft 6 and the rotor of the high-pressure compressor and fixed elements located essentially at the level of the combustion chamber 12, to then pass between the outer shaft 6 and a bore formed in the disc 14.1 of the high-pressure turbine 14, along the rotor of the low-pressure turbine 16 and join in 18.2 the primary flow at the outlet of the low-pressure turbine 16.

As can be seen in FIG. 1, the passage 18 between the outer surface of the outer shaft 6 and the bore of the rotor disc 14.1 has a reduced section ensuring a high flow speed promoting heat exchange. Heat transfer by forced convection between a wall and a moving fluid can be characterized by the Nusselt number (Nu) which directly depends on the Reynolds number. In other words, and in a somewhat simplified manner, a turbulent flow in this passage is favorable to a significant heat exchange, which makes it possible to protect the rotor, in this case the disc 14.1, of the high-pressure turbine 14, supporting the turbine blades 14.2 at the outlet of the combustion chamber 12 and therefore subjected to very high temperatures. As can be seen in FIG. 1, the passage 18 has several reduced sections between the outer surface of the outer shaft 6 and various disks, such as in particular the disks of the high-pressure compressor rotor 10, also ensuring significant heat exchanges. and useful. This cooling is commonly designated by the expression "Bore Cooling" because the cooling takes place essentially through these reduced sections through the bore of the discs.

FIG. 2 is a perspective view of the outlet of the annular duct 20 and of the rectifier stage 22 at the inlet of the high-pressure compressor 10 of FIG. 1. The rectifier stage 22 comprises a row of vanes 24 arranged radially, and an inner ring 26 receiving the root 24.2 of the vanes 24. In FIG. 2, only five vanes 24 are shown, the first vane of which is in section in a longitudinal plane. The first row of rotor blades of the high-pressure compressor 10, located directly downstream of the rectifier stage 22 and visible in FIG. 1, is not shown. It can be observed that the annular duct 20 is delimited by an inner wall 20.1 and an outer wall 20.2 and that fixed vanes 20.3 oriented essentially axially are disposed radially between the walls in question. Each of the orientable vanes 24 comprises an aerodynamic blade 24.1 extending radially, a root 24.2 at the inner end of the aerodynamic blade 24.1 and a head 24.3 at the outer end of the blade 24.1. The heads 24.3 of the vanes are arranged in corresponding housings formed in the outer wall 20.2. The vanes 24 are all orientable around radial axes of rotation, in a synchronized manner, so as to vary the passage section for the air passing through the compressors of the axial turbomachine. The orientable mounting of the vanes and their synchronized control is in itself well known to those skilled in the art. The rectifier stage 22 however has the particularity that it forms the air intake 18.1 of the leak passage 18, more precisely an air leak passage 18.1.1 with a section that can be adjusted as a function of the angular position of the vanes 24.

Figure 3:
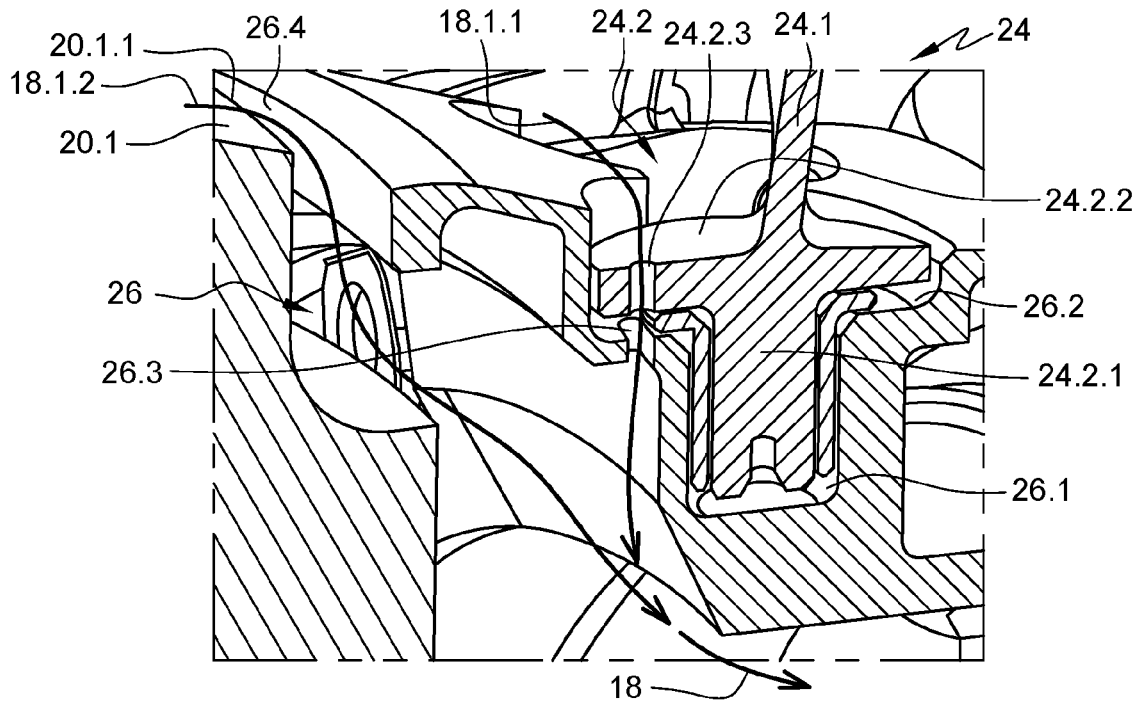
FIG. 3 is an exemplary detail view of FIG. 2 showing the modular air leak passage produced by the rectifier stage, in the open state, according to various embodiments of the invention.

FIG. 3 is a detailed view of the implantation of the root 24.2 of the vane 24 shown in section, in the ring 26. The root 24.2 essentially comprises a journal 24.2.1 engaging in a bore 26.1 produced in the ring 26, and a platform 24.2.2, in various instances circular, housed in a counterbore 26.2 formed in the ring, concentric with the bore 26.1. The platform 24.2.2 comprises an orifice 24.2.3 passing through it, and the countersinking 26.2 of the ring comprises a corresponding orifice 26.3 arranged opposite the orifice 24.2.3 of the platform. As can be seen in FIG. 3, a leak passage with adjustable section 18.1.1 is formed through orifices 24.2.3 and 26.3. This passage can be modulated in that a rotation of the vane 24 tending to misalign the orifices 24.2.3 and 26.3 will reduce the passage section and potentially close it. In the angular position of FIG. 3, the section of the modular leak passage 18.1.1 is maximum.

The leak passage with adjustable passage section 18.1.1 which has just been described can be formed on each of the vanes 24, on some of the vanes 24 or even one of the vanes 24 of the rectifier stage 22.

It is interesting to note that another leak passage 18.1.2 can be provided, in parallel with the leak passage with adjustable passage section 18.1.1. The leak passage 18.1.2 is essentially defined by the clearance between the front edge 20.1.1 of the inner wall 20.1 and the edge 26.4 facing the ring 26. This passage cannot be adjusted in that it cannot be changed on demand. Its section is fixed except that it can vary according to the expansion of the various components of the axial turbomachine.

FIGS. 4 and 5 correspond to FIGS. 2 and 3 where the vanes are in another angular orientation.

In FIG. 4 it can be observed that the vanes 24 of the rectifier stage 22 are oriented more in the axial direction, corresponding to a greater air flow rate, such as for example an acceleration or even a nominal speed.

In FIG. 5 we observe that the orifice 24.2.3 formed on the platform 24.2.2 of the root 24.2 of the vane 24 is no longer opposite the corresponding orifice 26.3 formed in the ring 26 The leak passage with adjustable section 18.1.1 is then closed. The non-modulating section leak passage 18.1.2 remains open. Under these operating conditions, the air leak flow rate for cooling in particular the high-pressure turbine is sufficient via only the non-modulating section leak passage 18.1.2, essentially due to the fact that the pressure in the annular duct 20 is greater and thus ensures sufficient flow. A sufficient flow rate will generate flow speeds in the various passages with reduced sections, in this case between the outer surface of the outer shaft 6 and the various disks, which are sufficiently large to ensure sufficient heat exchange and, hence, satisfactory cooling.

As can be seen in FIGS. 3 and 5, a friction ring can be disposed between the journal 24.2.1 of the root 24.2 of the vane 24 and the corresponding bore 26.1 in the ring 26. This ring can have a flange in support on the platform 24.2.2, in this case on an interior face of the platform. The flange then has an outside diameter selected to avoid interfering with the orifices 24.2.3 and 26.3 on the vane 24 and the ring 26, respectively.

FIG. 6 is a perspective view of a portion of the ring 26 of the rectifier stage 22 detailed previously. We can see the bores 26.1, the countersinks 26.2 and the orifices 26.3 detailed above.

FIG. 7 is a perspective view of one of the vanes 24 of the rectifier stage 22. It can be seen there that the vane head 24.3 can also have a platform, similarly to the platform 24.2.2 of the root 24.2 of the vane. The head 24.3 can have, in a manner not shown, means for rotating connection with a control lever of the vane, for example for actuation of a conventionally known type.

The invention claimed is:
1. A turbomachine, said turbomachine comprising:
   a compression device with a rectifier stage with variable orientation vanes;
   a combustion chamber downstream of the compression device;
   a turbine device downstream of the combustion chamber; and a leak passage of air compressed by the compression device, between the compression device and the turbine device, in order to cool the turbine device;

wherein the rectifier stage is configured to modulate a section of the leak passage according to an orientation of the vanes of the rectifier stage; and wherein the rectifier stage comprises an inner ring comprising an upstream edge facing a downstream edge of an annular duct on an intermediate casing of the turbomachine, with a clearance between the edges forming a leak passage with a non-modulating section in parallel with the leak passage with a modulating section formed by the rectifier stage.

2. The turbomachine according to claim 1, wherein the modulation of the section of the leak passage by the rectifier stage is such that the section of the leak passage increases when the rectifier stage decreases a passage section in the compression device, and vice versa.

3. The turbomachine according to claim 1, wherein at least one of the vanes of the rectifier stage comprises a root with an orifice or a notch forming, with an orifice or a corresponding notch on the inner ring of the rectifier stage, the leak passage with the modulating section depending on the orientation of the vanes of the rectifier stage.

4. The turbomachine according to claim 3, wherein, for each of the at least one vane of the rectifier stage, the root comprises a platform with a lower face perpendicular to a radial direction corresponding to an axis of rotation of the vane, the orifice or notch of the root being formed in the platform, and the leak passage with the modulating section, through the orifice or notch in the platform, being parallel to the radial direction.

5. The turbomachine according to claim 4, wherein, for each of the at least one vane of the rectifier stage, one of the orifice or notch on the platform and the orifice or notch on the inner ring is larger than the other so as to form a maximum passage section over an angular positioning range of the vane of more than 15°.

6. The turbomachine according to claim 4, wherein for each of the at least one vane of the rectifier stage, the orifice or the notch in the root has a passage section wherein:
the passage section is greater than 10 mm$^2$; and
the passage section is less than 30 mm$^2$.

7. The turbomachine according to claim 1, wherein the compression device comprises a low-pressure compressor and a high-pressure compressor downstream of the compressor low-pressure via an annular duct formed on an intermediate casing of the turbomachine, the rectifier stage being at an inlet of the high-pressure compressor, downstream of the annular duct.

\* \* \* \* \*